Nov. 10, 1970  F. C. ARRANCE  3,539,394

SEPARATOR FOR ELECTROCHEMICAL DEVICES

Filed May 8, 1968

FRANK C. ARRANCE
INVENTOR.

BY Max Geldin
ATTORNEY

United States Patent Office 3,539,394
Patented Nov. 10, 1970

3,539,394
SEPARATOR FOR ELECTROCHEMICAL DEVICES
Frank C. Arrance, Costa Mesa, Calif., assignor to McDonnell Douglas Corporation, Santa Monica, Calif., a corporation of Maryland
Filed May 8, 1968, Ser. No. 727,678
Int. Cl. C04b *35/04, 35/10;* H01m *3/02*
U.S. Cl. 136—6                                        11 Claims

ABSTRACT OF THE DISCLOSURE

Production of inorganic porous sintered separator for electrochemical devices, consisting essentially of a solid solution of $Cr_2O_3$, $Al_2O_3$, FeO and MgO, by a procedure including forming a mixture of the above noted oxides, sintering such mixture at temperatures to form a solid solution of such oxides, cooling and grinding such sintered mixture to small particle size, preferably less than 5 microns, compacting such ground, sintered mixture in the presence of an organic binder, into separator membranes, calcining such separator membranes at a temperature to remove the organic binder, and finally sintering such separator membranes in an oxidizing atmosphere.

---

Figure 1:
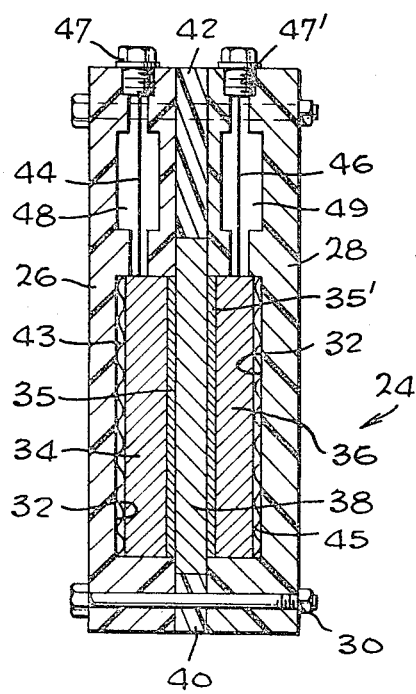

The resulting separators have very low electrical resistivity, high physical strength and superior chemical resistance with respect to concentrated alkali, e.g., KOH, and oxidation by the silver electrode, and are particularly valuable for use in high rate batteries.

This invention relates to electrochemical devices, such as batteries, particularly high energy density batteries, fuel cells, and the like, where a low resistance barrier or separator between the electrodes is required, such separators having improved strength and resistance to alkali and low resistivity; with procedure for producing such separators, and with improved battery constructions embodying such improved separators, said separators being particularly designed for use in secondary batteries capable of a large number of charge-discharge cycles at ambient and at elevated temperatures, and which are capable of thermal sterilization at temperatures, e.g., of the order of about 125° to about 150° C.

Batteries are an important source of energy storage for power generation in air-borne systems. An important type of battery particularly suited for such applications are the high energy density alkaline electrolyte cells using such electrode combinations as silver-zinc, silver-cadmium and nickel-cadmium. Another recently developed high energy type battery is the so-called metal-air or metal-oxygen battery, such as the zinc-air battery. High energy density batteries of these types are generally battery systems which have a substantially higher energy per unit of weight than conventional batteries, e.g., lead storage batteries. Thus, high energy density batteries can develop, e.g., 100 to 140 watt hours of energy per pound. In addition to important air-borne applications, such high energy density batteries have many other applications, such as in portable tools and appliances, television, radio and record players, engine starting, portable X-ray units and the like.

Other types of batteries which are presently gaining importance are thermal batteries which are operable at high temperatures and which employ fused electrolytes such as molten potassium hydroxide and potassium carbonate, and fused salts such as eutectic potassium chloride-lithium chloride electrolyte.

In batteries of the above types, the separator performs the function of retatining electrolyte, e.g., potassium hydroxide, separating the electrodes, and preventing migration of electrode ions or growth of dendritic crystals of electrode ions which short circuit the battery. It has been known to employ organic separators in such batteries, but these have several disadvantages. Thus, such organic separators are not chemically stable, especially at temperatures above 50° C., they tend to swell excessively at elevated temperatures. and most organics are not readily wetted by caustic solutions. Further, organics are not inert to silver oxide in caustic solutions and organic materials are generally soft and pliable and are subject to puncture by dendrite growth.

To avoid the disadvantages inherent in the use of organic separators various types of inorganic separators have been developed which, when assembled in a battery, e.g., a silver-zinc high energy density battery, have resulted in substantially improved battery life at both ambient temperature and elevated temperature, that is, a battery capable of operating efficiently over a large number of discharge-charge cycles, and such batteries are also operable at high temperatures, e.g., of the order of 100° C. and above.

Thus, for example, in the copending application Ser. No. 555,891, of Frank C. Arrance and Carl Berger, filed June 7, 1966, now Pat. No. 3,446,669 there is described and claimed improved inorganic separators in the form of a sintered porous solid solution of a major proportion of an aluminum-bearing material such as aluminum oxide and a substance selected from the group consisting of chromium, cobalt, nickel, magnesium, calcium and iron-bearing materials, e.g., a mixture of a major proportion of alumina and chromic oxide, However the continued development of inorganic separators having improved strength and improved resistance to alkali employed in high energy density batteries, and having high porosity, for incorporation in high energy density batteries to obtain improved battery performance, such as high discharge voltage and improved impact, vibration and environmental characteristics, is of particular interest to the industry.

U.S. Pat. 3,174,881 to McEvoy describes production of a sintered magnesium oxide plate as catalytic fuel electrodes for use in high temperature fuel cells to form a matrix to hold the electrolyte for the fuel cell. However, it has been found that the resulting magnesium oxide disc or plate is relatively soft and fragile and cannot be successfully employed as a battery separator.

In U.S. Pat. 2,422,045 to Ruben there is disclosed primary dry cells having a cathode and anode which are separated by a barrier disc, such disc being a porous spacer of inorganic materials such as pressed discs of magnesium hydroxide powder. However, such spacers are ineffective for use in secondary batteries, and particularly have insufficient strength for such use and are not resistant to alkali.

It has now been found, according to the invention, that improved separators especially useful for employment in electrochemical devices, particularly alkaline batteries, can be produced by controlled sintering of a mixture of chromium oxide; aluminum oxide, ferrous oxide and magnesium oxide, derived from natural minerals such as natural chromite ore, or produced synthetically, to form a single phase solid solution, forming a separator structure which has high mechanical strength, high resistance to KOH and to other electrolytes employed in batteries, low electrical resistivity, and which has good voltage and electrical characteristics, rendering such separators especially valuable for use in high rate batteries.

The improved solid solution separators of the invention are produced by a process which comprises forming a mixture consisting essentially of $Cr_2O_3$, $Al_2O_3$, FeO and MgO, the total of such $Cr_2O_3$ and $Al_2O_3$ being present in major proportion, sintering said mixture at temperature ranging from about 1000° to about 1500° C. and forming a solid solution, cooling and grinding such sintered mixture substantially to a particle size less than 5 microns, compacting the ground, sintered mixture in the presence of an organic binder, and forming separator membranes, heating said separator membranes at temperature in the range of about 400° to about 800° C. to remove said binder, and finally sintering said separator membranes in an oxidizing atmosphere at temperatures in the range of about 1200° to about 1500° C.

The resulting separators comprise a porous membrane consisting essentially of a solid solution of $Cr_2O_3$, $Al_2O_3$, $Fe_2O_3$ and MgO, the total of such $Cr_2O_3$ and $Al_2O_3$ being present in major proportion. In the sintered, solid solution separators formed from the above noted initial mixture, the FeO of the initial mixture is converted to $Fe_2O_3$ as a result of the oxidizing atmosphere present during sintering, as will be pointed out in detail hereinafter.

In carrying out the process, the formulation or mixture of materials or oxides noted above can be prepared by selecting synthetic compounds or natural minerals having the above noted desired chemical compositions. Preferred materials for providing the above noted starting materials are chromite ($FeCr_2O_4$), magnesia (magnesium oxide), serpentine (hydrated magnesium silicate), bauxite (aluminum oxide), dolomite (calcium magnesium carbonate), limestone (calcium carbonate), and the like. A preferred starting material is natural chromite, which is the predominant mineral in chrome ore. Natural chromite consists chiefly of a number of minerals or compounds generally expressed as FeO, $Cr_2O_3$, MgO and $Al_2O_3$.

The preferred compositional range for the essential components or oxides of the starting mixtures, according to the invention, is set forth below:

TABLE 1

| | Ranges—percent by wt. |
|---|---|
| FeO | 12–20 |
| MgO | 10–20 |
| $Al_2O_3$ | [1] 13–30 |
| $Cr_2O_3$ | [1] 30–50 |

[1] Total is at least 60%.

The above noted natural chromite, which is the preferred starting material, contains each of the four components or oxides noted immediately above and within the ranges of proportions set forth above.

In addition, natural chromite usually contains minor proportions of $SiO_2$ and CaO, in the ranges of proportions noted below:

TABLE 2

| | Ranges—percent by wt. |
|---|---|
| $SiO_2$ | 3–6. |
| CaO | 1 or less. |

Also, natural chromite can contain 0.1% to 0.3% MnO, traces of vanadium and NiO, and about 0.1% to 1.0% $TiO_2$.

It will be understood that the components of the starting mixture, preferably chromite, and noted above as in Tables 1 and 2, are expressed in the form of oxides, which is the usual manner of expressing the individual components of such complex mixtures as natural chromite. However, it will be understood that the particular elements present in the starting mixture, e.g., natural chromite, can be tied up as complex forms of silicates, aluminates, and chromates, e.g., of magnesium and iron. Further, solid solutions of the excess $R_2O_3$ constituents ($Fe_2O_3$, can be in a more highly oxidized state, such as in the form of $Fe_2O_3$.

The starting mixture, e.g., natural chromite, is preferably first ground or crushed, as by ball milling, to a desired fineness, and the resulting crushed material is then sintered to a temperature in the range of about 1000° to about 1500° C. This sintering operation preferably is carried out in an oxidizing atmosphere for a period of about 2 to about 10 hours in order to convert the ferrous ion to ferric oxide and to develop the desired spinel structure ($MgO \cdot R_2O_3$), where R is Cr, Al or Fe, and the solid solutions of the excess $R_2O_3$ constituents, ($Fe_2O_3$, $Cr_2O_3$, $Al_2O_3$), which dissolve in the spinel crystals. The MgO replaces the FeO in the original spinel structure and also combines with the newly formed $Fe_2O_3$ to preserve the spinel structure. This results in a highly stable structure in the form of a single phase solid solution of $MgO \cdot Fe_2O_3$, $MgO \cdot Al_2O_3$ and $MgO \cdot Cr_2O_3$, which is highly resistant to reduction.

The sintered formulation is then finely ground, e.g., in water, and preferably employing an aluminum oxide medium or $Al_2O_3$ grinding balls to enrich the alumina content of the formulation. The crushing or grinding conditions preferably are adjusted so as to result in at least 95% of the material being ground to a particle size finer than 5 microns.

To the resulting ground and sintered mixture there is added an organic binder to function as a temporary binder to cause the particles of inorganic material in the mixture to cohere, and to act as a pressing lubricant. Any suitable organic binder can be employed for this purpose, such as microcrystalline wax, carbowax, gums such as gum arabic, and gum tragacanth, dextrin, and the like. Such organic binder is generally employed in minor proportions, e.g., about 2% to about 5% by weight of the total composition. A preferred organic binder for this purpose is the material marketed as "Mobilcer C," a water emulsion of such wax.

The mixture containing organic binder is then compacted or pressed into separators, e.g., of about 0.010 to about 0.040 inch thickness, by compaction, e.g., at pressures of about 5,000 to about 20,000 p.s.i., and the pressed separators are then heated or calcined at temperature in the range of about 400° to about 800° C. in air, thus removing or pyrolizing the temporary organic binder, the heating of the separators to the aforementioned temperatures being carried out relatively slowly at a rate of about 150° C. per hour, and then the separators are sintered in a strongly oxidizing atmosphere at temperature in the range of about 1200° to about 1500° C. about 1 to 4 hours. This second sintering operation binds the inorganic material into a strong separator member, and provides the required porosity. The sintered separators are then cooled to ambient temperature.

The resulting solid solution separators contain substantially the same proportions of oxides as noted above in Tables 1 and 2, except that the FeO substituent is expressed as $Fe_2O_3$, for reasons noted above.

The solid solution separators produced according to the invention have high transverse strength ranging from about 10,000 to about 20,000 p.s.i. The porosity or water absorption of such separators can be controlled to obtain a desired value, so that such porosity can range from about 10% to about 40%, usually from about 10% to about 25%.

The solid solution separators of the invention have pore size characteristics permitting retention of electrolyte and passage of electrolyte ion, such as hydroxyl ion, while preventing migration of electrode ions, e.g., silver ions, through the separator. Pore sizes of the solid solution separators of the invention can range, e.g., from about 1 to about 300 angstroms, preferably from about 100 to about 250 angstroms.

The structure of the solid solution separators of the invention can be readily identified by crystallographic and X-ray diffraction methods. See Dana's Manual of Mineralogy, 17th edition, pp. 204 and 205.

The inorganic solid solution produced according to the invention, and in ground particulate form, can be employed as inorganic separator material used in flexible separators. These include, for example, the flexible separators described in the copending application Ser. No. 676,224, filed Oct. 18, 1967, of C. Berger and F. C. Arrance and consisting, for example, of a porous inorganic material, which can be the above noted solid solution of the present invention, and a minor portion of a water coaguable organic fluorcarbon polymer such as vinylidene fluoride polymer, to bond the particles of the inorganic material. Also, the above noted solid solution according to the invention, in particulate form, can be employed as the inorganic material in the flexible separators described in my copending application Ser. No. 676,223, filed Oct. 18, 1967, and consisting, for example, of a major portion of such inorganic material, e.g., the above noted solid solution of the invention, a minor portion of potassium titanate, and a minor portion of a cured organic polymer such as polyphenylene oxide as bonding agent.

The following are examples of practice of the invention.

EXAMPLE 1

The following composition was mixed:

| | Percent by weight |
|---|---|
| $Al_2O_3$ | 16.0 |
| MgO | 11.0 |
| $SiO_2$ | 4.0 |
| $Cr_2O_3$ | 45.0 |
| FeO | 19.0 |
| CaO | 1.0 |
| $Na_2O$, $K_2O$, BaO | 4.0 |
| | 100.0 |

After mixing by ball milling, the above composition was sintered to about 1350° C. in an oxidizing atmosphere for about 6 hours. The sintered formulation was then finely ground in water using aluminum oxide grinding balls, resulting in a mixture in which at least 95% of the particles were ground to a size finer than 5 microns.

To the sintered and ground formulation was added 4% of "Mobilcer C" microcrystalline wax emulsion, based on the total weight of the composition, and the resulting formulation containing organic binder was then dried and, after such drying, 2" x 2" x 0.025" separators were compacted from the formulation employing about 40,000 pounds total load. The resulting pressed separators were then calcined by heating to temperature of about 540° C. in air, thus removing the temporary microcrystalline wax binder, and were finally sintered in a strongly oxidizing atmosphere at temperature of 1300° C., for about 2 hours, followed by cooling to ambient temperature.

The resulting separators had a porosity (water absorption) of 12.4% and a strength (modulus of rupture) of 12,000 p.s.i. The separators had a pore diameter ranging from about 10 to about 100 angstroms. Their resistivity was 4 to 7 ohm-cm.

A separator prepared as described above and standard silver and zinc electrodes were assembled to form a battery as illustrated in FIG. 1 of the drawing, employing a plastic case 24 formed of two symmetrical, e.g., Teflon, half portions 26 and 28 which are bolted together as indicated at 30. Compartments 26 and 28 of the case have recesses 32 formed therein which receive the zinc and silver electrodes 34 and 36, respectively. A solid solution sintered separator 38 prepared as described above is disposed centrally between the case portions 26 and 28 so that the electrodes 34 and 36 are pressed against opposite surfaces of such separators, with a potassium titanate paper 35 inserted between the zinc electrode 34 and separator 38, and a similar potassium titanate paper 35' inserted between the silver electrode 36 and separator 38, to aid in supporting such electrodes. However, it will be understood that, if desired, such potassium titanate papers can be omitted. Teflon spacers 40 and 42 are provided about the periphery of separator 38, to form a leakproof seal. Nickel screens 43 and 45 are in contact with electrodes 34 and 36 adjacent to the bottom of the compartment recesses 32, and silver terminal wires 44 and 46 are connected respectively to the screens 43 and 45, and are brought through the plastic electrode sections at the top of the assembly and connected to terminals 47 and 47', as shown. Small electrolyte reservoirs 48 and 49 are provided in the upper portion of the respective electrode compartments 26 and 28.

A 30% aqueous solution of potassium hydroxide was added as electrolyte to the above described battery.

It was found that, when employed in a silver-zinc battery as described above, the solid solution separator of the invention permitted high discharge rates for the battery at satisfactory voltages, as follows:

| Discharge rate | Voltage |
|---|---|
| 0.4 A./in.² | 1.40 |
| 0.3 A./in.² | 1.44 |
| 0.2 A./in.² | 1.48 |

The solid solution separator described above was sterilized or heated in KOH for 64 hours at 135° C. and survived without significant change in resistivity.

EXAMPLE 2

The procedure of Example 1 was carried out, except that the initial formulation had the following composition:

| | Percent by weight |
|---|---|
| FeO | 18 |
| MgO | 17 |
| $Al_2O_3$ | 25 |
| $Cr_2O_3$ | 40 |
| | 100 |

A solid solution separator was produced having properties similar to that of the solid solution separator in Example 1, and produced results when incorporated in a silver-zinc battery of the type illustrated in FIG. 1 of the drawing, with respect to the electrical characteristics thereof.

EXAMPLE 3

A natural chromite having the following composition was crushed to a fineness which passes through a standard 14 mesh screen and ball milled for 15 hours using alumina grinding balls:

| FeO | 13 |
|---|---|
| MgO | 12 |
| $SiO_2$ | 3 |
| $Al_2O_3$ | 28 |
| $Cr_2O_3$ | 43 |
| CaO | 1 |
| | 100 |

After grinding and oven drying to remove the water, it was sintered to 1200° C. for one hour in an oxidizing atmosphere and cooled. The sintered formulation was then ground to a fineness of 95% finer than 5 microns, dried and granulated for compaction into battery separators approximately 2" x 2" x 0.25". About 4 percent of a water emulsion of a microcrystalline wax (Mobilcer C) was used as a temporary binder and pressing lubricant. The pressed separators were first heated slowly to about 500° C. to remove the organic additives and then sintered in a strongly oxidizing atmosphere to 1300° C. for 2 hours, followed by cooling to room temperature.

The separators produced by this procedure had a porosity or water absorption of about 12 percent and a transverse strength of about 15,000 p.s.i. When saturated with 31 percent KOH, their resistivity was 7 ohm-cm.

Samples of these separators were tested in a silver-zinc battery as illustrated in FIG. 1 and were found to be capable of high rate discharge at satisfactory voltage levels as follows:

| Discharge rate | Voltage |
| --- | --- |
| 0.4 A./in.$^2$ | 1.40 |
| 0.3 A./in.$^2$ | 1.44 |
| 0.2 A./in.$^2$ | 1.48 |

Tests on this battery were also run to determine the cycle life capability of these separators. When cycled at 2 hour discharge and 4 hours recharge at about 50 percent depth of discharge at room temperature, 200 cycles were completed without separator failure. Additional batteries of the same design were subjected to total discharge tests in which the cells were fully discharged to 1.0 v. in about 5 hours followed by a recharge in about 15 hours. In these tests, 50 cycles were completed without separator failure due to either zinc dendrite penetrations, silver migration or mechanical failure.

Separators of this type were also thermally sterilized for 64 hours at 135° C. in 30 percent KOH. No measurable change in resistivity or physical characteristics resulted.

EXAMPLE 4

A formulation was prepared as described in Example 3 above, except that the initial heat treatment consisted of heating the ball milled material to 1500° C. for 2 hours. After compaction, the separators formed were sintered in a highly oxidizing atmosphere to 1200° C. for 2 hours and cooled to room temperature. These separators had a porosity or water absorption of 20 percent and a transverse strength of 12,000 p.s.i. Their resistivity was 4 ohm-cm.

Evaluation in a silver-zinc test battery of the type illustrated in FIG. 1 resulted in performance which was comparable to that obtained in Example 3.

EXAMPLE 5

A formulation was prepared composed of 97% natural chrome ore and 3% bentonite. This formulation had the following approximate oxide analysis:

| | Percent by weight |
| --- | --- |
| FeO | 13 |
| MgO | 13 |
| SiO$_2$ | 4 |
| Al$_2$O$_3$ | 30 |
| Cr$_2$O$_3$ | 39 |
| CaO | 1 |
| | 100 |

The formulation was ball milled and sintered to 1300° C. as described in Example 3. It was then reground and formed into separators which were sintered as previously described to 1400° C.

The resulting separators were evaluated in a silver-zinc battery with results which were comparable to those obtained in Example 3.

EXAMPLE 6

Figure 2:
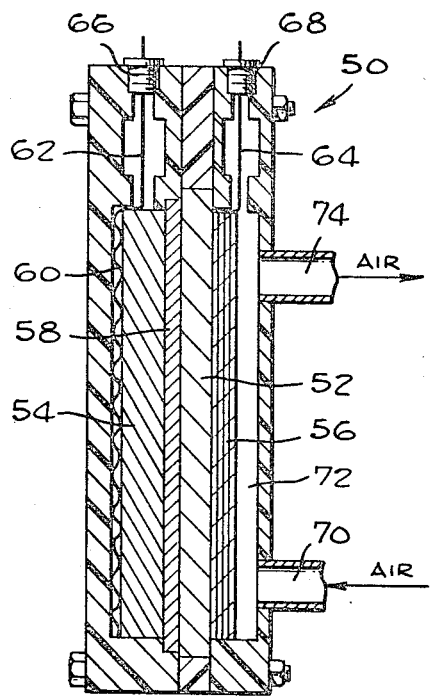

The solid solution separator prepared as described in Example 1 was tested in a zinc-air or zinc-oxygen battery of the type illustrated in FIG. 2. In the zinc-air battery 50 in FIG. 2, the solid solution sepaartor 52 of Example 1 is disposed between a standard zinc electrode 54 and a gas diffusion or air electrode 56, which can be a platinum catalyst electrode of the American Cyanamid Type AA-1 or AB-40. A potassium titanate paper 58 is inserted between the zinc electrode 54 and the separator 52, and a silver collector screen 60 is pressed against the opposite surface of the zinc electrode 54. Leads 62 and 64 connect the zinc electrode collector screen 60 and the air electrode 56, to terminals 66 and 68, respectively. An air inlet 70 is provided for passage of air into chamber 72 and into contact with the air electrode 56, and an air outlet 74 is provided from chamber 72.

The zinc electrode 54 is wetted or saturated with 30% potassium hydroxide to an extent such that the battery can be titled in any direction without any flow of electrolyte, to prevent flooding of the air electrode 56.

A battery of the type illustrated in FIG. 2 can be operated over a large number of charge-discharge cycles without evidence of any separator impairment.

EXAMPLE 7

A battery substantially similar to that described in Example 1 and shown in FIG. 1 of the drawing, and incorporating the solid solution separator described in Example 1 is assembled, except that the electrodes are silver and cadmium.

Such a battery also has physical properties and electrical characteristics on the order of those for the silver-zinc battery containing the separator of Example 1.

EXAMPLE 8

A battery substantially similar to that of Example 1 and shown in FIG. 1 of the drawing, is assembled employing the solid solution separator of Example 1, except that the electrodes are nickel and cadmium.

Such battery has physical properties and electrical characteristic similar to the silver-zinc battery containing the separator of Example 1.

The solid solution separator of the invention can also be applied in other electrochemical systems, such as non-aqueous batteries, fuel cells, and other electrochemical devices where a low resistance barrier between the electrodes is desired.

From the foregoing, it is seen that the invention provides strong and highly efficient inorganic separators having a chemical composition and structure, which, when incorporated in a battery, particularly into a high energy density alkaline battery such as a silver-zinc battery, or a metal-air battery such as a zinc-air or zinc-oxygen battery, permits extended operation at ambient temperatures as well as at higher temperatures of operation, without deterioration of the separators by the electrolyte or oxidation by the silver electrode, and an improved power output. The separators of the invention are particularly characterized by high mechanical strength, high porosity, and low resistivity, such separators being especially useful in high rate batteries of the types noted above, and can also be employed in conventional lead-acid batteries.

During discharge of batteries such as those illustrated in FIGS. 1 and 2, and described in the above examples, as is well known, the zinc converts to zinc oxide and the silver oxide to silver, and during charging of such batteries the silver is oxidized to silver oxide and the zinc oxide is reduced to zinc. Because of these reversible reactions, the terms "silver" and "zinc," the terms "silver" and "cadmium," and the terms "nickel" and "cadmium," referring to the metals forming the respective electrodes of silver-zinc, silver-cadmium and nickel-cadmium battery systems, are intended to denote either the respective metals themselves or the corresponding oxides thereof.

While I have described particular embodiments of my invention for purposes of illustration, within the spirit of the invention, it will be understood that the invention is not to be taken as limited except by the scope of the appended claims.

I claim:

1. A separator for an electrochemical device, comprising a porous membrane consisting essentially of a solid solution consisting essentially by weight of about 30% to about 50% Cr$_2$O$_3$, about 13% to about 30% Al$_2$O$_3$, the total of said Cr$_2$O$_3$ and Al$_2$O$_3$ being at least 60%, about 12% to about 20% Fe$_2$O$_3$, and about 10% to about 20% MgO.

2. A separator for an electromechanical device as defined in claim 1, said solid solution also containing about 3% to about 6% $SiO_2$ and CaO in an amount not more than about 1% by weight of said mixture.

3. A separator for an electrochemical device as defined in claim 1, said solid solution being a synthetic spinel structure of $MgO \cdot Fe_2O_3$, $MgO \cdot Al_2O_3$ and $MgO \cdot Cr_2O_3$.

4. A separator as defined in claim 1, said solid solution formed from natural chromite.

5. A separator as defined in claim 1, wherein said separator is a sintered porous membrane.

6. A separator as defined in claim 1, said separator having a porosity of about 10% to about 40%, and a pore size of from about 1 to about 300 angstroms.

7. An electrochemical device comprising electrodes and a separator positioned between said electrodes, said separator comprising a porous membrane consisting essentially of a solid solution consisting essentially by weight of about 30% to about 50% $Cr_2O_3$, abiut 13% to about 30% $Al_2O_3$, the total of said $Cr_2O_3$ and $Al_2O_3$ being at least 60%, about 12% to about 20% $Fe_2O_3$ and about 10% to about 20% MgO.

8. An electrochemical device as defined in claim 7, said solid solution being a synthetic spinel structure of $MgO \cdot Fe_2O_3$, $MgO \cdot Al_2O_3$ and $MgO \cdot Cr_2O_3$.

9. An electrochemical device as defined in claim 7, said solid solution formed from natural chromite.

10. An electrochemical device as defined in claim 7, wherein said separator is a sintered porous membrane.

11. An electrochemical device as defined in claim 7, wherein said electrochemical device is a silver-zinc battery, said electrodes being silver and zinc electrodes.

References Cited

UNITED STATES PATENTS

| 1,814,088 | 7/1931 | Housman | 106—66 |
|---|---|---|---|
| 3,342,616 | 9/1967 | Alper et al. | 106—59 |
| 3,443,974 | 5/1969 | Martinet | 106—59 |
| 3,446,669 | 5/1969 | Arrance et al. | 136—146 XR |

WINSTON A. DOUGLAS, Primary Examiner

D. L. WALTON, Assistant Examiner

U.S. Cl. X.R.

106—60, 62, 66; 136—146, 148